No. 699,039. Patented Apr. 29, 1902.
B. F. THOMAS.
DUMPING DEVICE.
(Application filed Feb. 5, 1902.)
(No Model.)
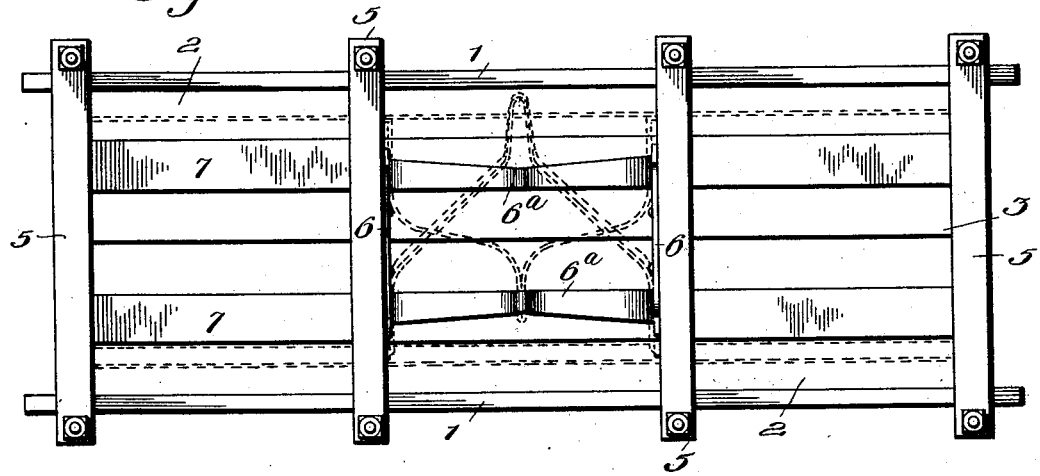
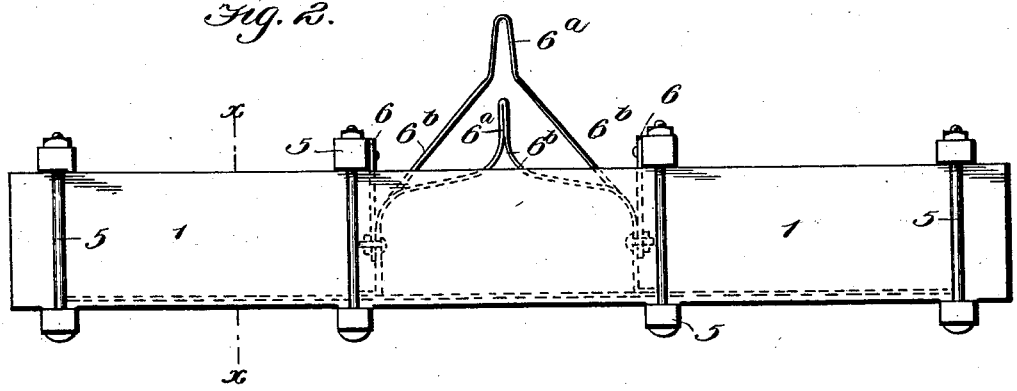
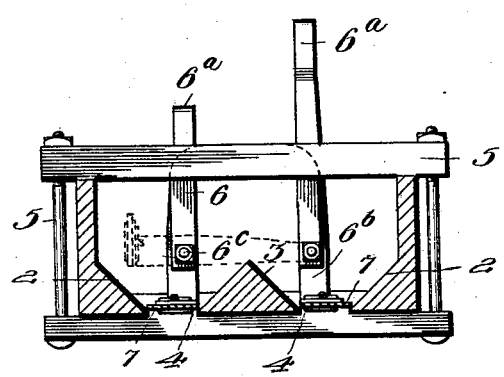
Witnesses
Inventor:
Benjamin F. Thomas
by: Edson Bros
Attorneys

UNITED STATES PATENT OFFICE.

BENJAMIN F. THOMAS, OF CAMDEN, INDIANA.

DUMPING DEVICE.

SPECIFICATION forming part of Letters Patent No. 699,039, dated April 29, 1902.

Application filed February 5, 1902. Serial No. 92,795. (No model.)

*To all whom it may concern:*

Be it known that I, BENJAMIN F. THOMAS, a citizen of the United States, residing at Camden, in the county of Carroll and State of Indiana, have invented certain new and useful Improvements in Dumping Devices; and I do hereby declare the following to be a full, clear, and exact description of the invention, such as will enable others skilled in the art to which it appertains to make and use the same.

My invention relates to improvements in dumping devices particularly adapted for cars, wagons, bins, &c. Its object is to provide a device of the above character which will be simple in construction, cheap of manufacture, and effective in operation.

My invention broadly consists of a receptacle having converging walls which form outlets and a plate adapted to open and close said outlet fixed to a bifurcated operating-lever which is pivoted at each of its forks; and it further consists in arranging two of said plates parallel to each other over corresponding outlets and adapting the handle of one of these operating-levers to pass within the forks of the other lever.

In the accompanying drawings, illustrating the preferred embodiment of my invention, Figure 1 is a plan view of my device, showing in dotted lines the manner of opening the outlets. Fig. 2 is a side elevation thereof; and Fig. 3 is a cross-section on the line $x\, x$, Fig. 2.

In carrying out my invention I provide a receptacle 1, having converging walls 2 2 and a central triangular rib or strip 3, which forms outlets 4. Suitable stays 5 are provided to brace said receptacle, and to the upper crosspieces of two of said stays are preferably secured inverted-U-shaped brackets 6. Bifurcated levers 6ª, having plates 7 secured to their lower ends, adapted to open and close the outlets of said receptacle, have their forks 6ᵇ pivoted to said U-shaped brackets by preferably bolts 6ᶜ, held in position by nuts 6ᵈ. The point of pivoting said levers is preferably inside the centers of the outlets in order that their plates 7 will clear the outer converging walls when said levers are moved inward and abut against the central triangular rib when the levers are moved in the opposite direction. The forks of one of the levers are extended sufficiently above those of the other to permit the handle of the short lever when moved inward to pass between them. This construction permits the plates to be swung entirely clear of the openings, which would not be the case if the levers were moved outward, as the sides of the receptacle would interfere with their movement, and, further, the direction in which levers are adapted to be moved provides spaces for a greater leverage. With the two outlets the dumping can be more effectively and expeditiously accomplished.

I do not wish to limit myself to the details of construction and arrangement of parts herein shown and described, as I am fully aware that the same may be changed and varied without in any way departing from the spirit of my invention and the same may yet remain intact and be protected.

Having described my invention, what I claim is—

1. In a dumping device, the combination with a receptacle having converging walls which form a discharge-outlet, of a plate adapted to open and close said outlet and a bifurcated operating-lever fixed to said plate at opposite sides of its center and pivoted to suitable supports.

2. In a dumping device, the combination with a receptacle having converging walls which form a discharge-outlet, of a plate adapted to open and close said outlet and a bifurcated operating-lever fixed to said plate at opposite sides of its center and detachably pivoted to suitable supports.

3. In a dumping device, the combination with a receptacle having converging walls which form a discharge-outlet, of a plate adapted to open and close said outlet, stays for said receptacle provided with brackets and a bifurcated operating-lever fixed to said plate at opposite sides of its center and pivoted to said brackets.

4. In a dumping device, the combination with a receptable having converging walls and a triangular central rib which form discharge-outlets, of a plate adapted to open and close said outlets and bifurcated operating-levers fixed to said plates at opposite sides of their centers and pivoted to suitable supports, having the handle of one adapted to pass between the forks of the other.

In testimony whereof I affix my signature in presence of two witnesses.

BENJAMIN F. THOMAS.

Witnesses:
G. W. ARMICK,
ENOCH SIEBER.